United States Patent [19]

Emmer et al.

[11] Patent Number: 5,681,521
[45] Date of Patent: Oct. 28, 1997

[54] PROCESS AND EQUIPMENT FOR HEAT TREATMENT OF THE BODY OF A PREFORM OR OF AN INTERMEDIATE-STAGE CONTAINER MADE OF A THERMOPLASTIC MATERIAL

[75] Inventors: Gerard Emmer; Paul La Barre, both of Le Havre cedex, France

[73] Assignee: Sidel, Le Havre Cedex, France

[21] Appl. No.: 537,727

[22] PCT Filed: Apr. 14, 1994

[86] PCT No.: PCT/FR94/00415

§ 371 Date: Oct. 13, 1995

§ 102(e) Date: Oct. 13, 1995

[87] PCT Pub. No.: WO94/23932

PCT Pub. Date: Oct. 27, 1994

[30] Foreign Application Priority Data

Apr. 15, 1993 [FR] France .................. 93 04447

[51] Int. Cl.[6] .................. B29C 49/68
[52] U.S. Cl. .................. 264/521; 425/526
[58] Field of Search .................. 264/521, 454, 264/458; 425/526, 174.4

[56] References Cited

U.S. PATENT DOCUMENTS

| 3,775,524 | 11/1973 | Seefluth . | |
| 3,950,459 | 4/1976 | Seefluth . | |
| 4,147,487 | 4/1979 | Dickson et al. | 425/526 |
| 4,151,249 | 4/1979 | Lee | 264/521 |
| 4,657,502 | 4/1987 | Rydmann . | |
| 4,928,835 | 5/1990 | Collette et al. . | |
| 5,229,042 | 7/1993 | Denis et al. | 264/25 |
| 5,256,341 | 10/1993 | Denis et al. | 264/521 |

FOREIGN PATENT DOCUMENTS

| 0442836 | 8/1991 | European Pat. Off. . | |
| 2305292 | 10/1976 | France . | |
| 903628 | 12/1953 | Germany . | |
| 2211307 | 9/1973 | Germany . | |
| 4033531 | 5/1992 | Germany . | |
| 4-49023 | 2/1992 | Japan | 264/521 |
| 5-269828 | 10/1993 | Japan | 264/521 |

Primary Examiner—Catherine Timm
Attorney, Agent, or Firm—Sughrue, Mion, Zinn, Macpeak & Seas, PLLC

[57] ABSTRACT

The invention relates to the thermal treatment of the body of a preform (1) or of an intermediate container made of a thermoplastic material during a process for manufacture of the container, such as a flask or bottle, in particular by blowing or stretching-blowing, the entirety of the body of the preform being heated to a temperature greater than the softening temperature of the material, at least one longitudinal portion (13) of the body (2) of the preform in rotation on itself being heated to a temperature greater than that of the rest (14) of the body, thereby making it possible to produce a finished container incorporating a body having a complex shape.

27 Claims, 7 Drawing Sheets

PROCESS AND EQUIPMENT FOR HEAT TREATMENT OF THE BODY OF A PREFORM OR OF AN INTERMEDIATE-STAGE CONTAINER MADE OF A THERMOPLASTIC MATERIAL

BACKGROUND OF THE INVENTION

The present invention concerns improvements introduced in the heat treatment of the body of a preform or of an intermediate-stage container made of a thermoplastic material, this treatment being carried out during the process of manufacture of a container, such as a flask or bottle, in particular by blowing or stretching-blowing, during which heat treatment the preform, while being made to rotate on itself, travels through a heating furnace.

There exist manufacturing processes involving a single blowing operation. Starting with an injection-produced preform, these processes consist in heating this preform and then injecting it and, potentially stretching it, so as to produce the final container.

There also exist processes which entail several distinct blowing and/or stretching/blowing operations. Beginning with an injected preform, these operations consist in effecting a first blowing operation to produce an intermediate container, which is, in turn, reheated and blown once again to produce the final container. A process of this kind and the various steps involved therein is described in Patents Nos. EP-A-0 442 836 and U.S. Pat. No. 5, 229, 042, held by the Applicant. To introduce some precision into the discussion, FIG. 1, attached, illustrates the diagrammatic shapes obtained during a process comprising two successive blowing and/or stretching-blowing operations and carried out under the conditions indicated in the aforementioned documents: i.e., the initial preform 1 (which is molded or injected) is transformed by a first blowing and/or stretching-blowing operation into a longitudinally- or transversely-oversized container $1_1$, which then undergoes heat treatment which, by virtue of the release of stresses, produces an intermediate, contracted container $1_2$. After heating, the latter is then, in turn, subjected to a second blowing or stretching-blowing operation, at the end of which the final container $1_3$ is obtained.

As illustrated in the attached drawings, with respect to a container preform 1, whether molded or injected, comprising a substantially cylindrical thick-walled body generated by rotation and, at one end, a hemispherical thick-walled bottom 3 and, at the other, a neck 4 incorporating its final shape and dimensions, the aforementioned preliminary heating operation consists in heating the body alone of the preform (excluding the neck) to a temperature greater than the vitreous transition temperature Tg of the thermoplastic material making up the preform.

In practice, heating is carried out by causing the preforms to travel in an oven 5 comprising at least one lateral heating wall (incorporating, for example, heating tubes 6 attached to the oven wall), while at the same time causing the preforms to rotate on themselves (arrow 7) so as to make the temperature within the material uniform. Protective means, i.e., shields 8 in the form of parallel tracks, ensure heat protection of the neck 4. A reflecting panel 9 may preferably be positioned opposite the tubes 6 to reflect back toward the bodies 2 of the preforms the fraction of the thermal radiation passing between two successive bodies.

When containers are produced having bodies that are approximately cylindrical and generated by rotation, the subsequent blowing or stretching-blowing process, which is performed in a mold on a heated preform or on the intermediate container, causes substantially uniform stretching of the heated, softened thermoplastic material in all radial directions (determined in relation to the preform axis). In this case, a container body possessing an even, uniform structure and a lateral wall having substantially constant thickness is produced.

However, problems arise when attempts are made to deviate from this conventional process.

First, difficulties are encountered when the final container is not approximately cylindrical and generated by rotation: for example, containers having a polygonal transverse section, whether triangular, quadrilateral, or pentagonal in particular, in which each approximately plane face extends substantially away from a cylindrical surface surrounding the edges, or containers having flattened bodies (e.g., bottles holding detergent products). In this case, as illustrated in FIG. 2B with respect to a container whose body 10 has an approximately square section, the material of the parts of the wall of the final container the farthest away from the axis A of the initial preform 1 (i.e., the angled parts 11) is subjected to a much higher degree of stretching than that applied to the material making up the parts of the wall remaining closest to said axis (i.e., the central parts 12 of the walls). Because even heating imparts to the material the same stretching characteristics in no matter what parts of the preform body, the greater degree of stretching of the parts of the walls 11 which are ultimately the most distant from the axis A of body of the preform 1 is accompanied by increased thinning of this part of the wall. Accordingly, the finished product is a container having non-uniform wall thickness, which is thinner (thickness e) in the parts 11 most distant from the axis A of the initial preform body (i.e., angled areas in a prismatic body and areas of slight curvature in bodies having an oval or elliptical section) and thicker (thickness E) in the parts 12 closest to the axis A of the beginning preform.

The mechanical strength of a container body incorporating an uneven configuration is not satisfactory.

In addition, the thinnest portions of the walls must possess sufficient mechanical strength, and the thickness of these portions of the wall must remain greater than a predetermined minimum value. Accordingly, in the thickest part of the wall, the wall thickness is excessive, and the quantity of material present exceeds the quantity required for the desired mechanical strength. Raw material is thus wasted.

Moreover, in containers having a flattened body, a deformation, termed "panelling" in the industry, appears on the parts of the wall remaining closest to the preform axis. This deformation results from the fact that the thickness in this part of the wall is excessively high and that the material exhibits a "memory" phenomenon caused by the non-uniformity of the stretching. The excessive thickness is caused by the fact that, during the blowing operation, the preform first comes into contact with the wall of the mold closest to the preform axis.

The same problem reoccurs on a container bottom having a complex shape (e.g., a pronounced oval shape). On this bottom, the thicknesses of the area in which the container is in contact with a plane and which are the most distant from the center are much smaller than those closest to the center.

Finally, all of these problems are exacerbated when the final container, produced from a preform exhibiting complete radial symmetry, is quasi-asymmetrical (e.g., a neck significantly off-center in relation to a prismatic or flattened body and possibly incorporating a handle, for example).

In addition, other difficulties are encountered when attempts are made to strengthen the rigidity of the container body by incorporating therein one or several annular reinforcement zones. According to one known solution carried out for this purpose, one or several annular zones of the body are crystallized. Although the crystallized material does in fact possess increased stiffness, this solution is not thought to be effective in practice, if only because of the coloration exhibited by the crystallized material, which imparts an unattractive appearance to the container.

The aforementioned problems appear with equal frequency in processes involving one or several blowing operations.

In fact, when using a process consisting of several blowing operations, the intermediate container exists in a relation to the initial preform which is similar to the relation of the final container to the initial preform produced when implementing a process consisting of a single blowing operation. Accordingly, the intermediate container produced during implementation of a process entailing multiple blowing operations may, in fact, be compared to a special preform obtained not by injection, but by extrusion of a primary injected preform.

Thus, in the remainder of the text, the term "preform" may be held to designate both (1) the initial preform obtained by injection and used in processes consisting of a single blowing operation and yielding the final container directly or in processes consisting of multiple blowing operations leading to the intermediate container; and (2) the intermediate container itself when a process comprising several blowing operations is implemented.

The problems mentioned above are such that they have, to date, slowed development of the manufacture of containers incorporating complex shapes by means of blowing or stretching-blowing techniques applied to a thick-walled preform, in particular one having a cylindrical body generated by rotation.

SUMMARY OF THE INVENTION

The invention is intended precisely to solve the problems described above, and to propose means (process and equipment) allowing heat treatment of the preform (or intermediate container) under conditions such that the final container possesses the desired characteristics, in particular an approximately uniform wall thickness, whatever its shape and in whatever part of its body, and/or peripheral mechanical reinforcement zones, said means consequently making it possible to save material in the manufacture of each container without, at the same time, lessening the mechanical properties or increasing the cost and complexity of the equipment used for this purpose.

To this end, in accordance with a first feature, the invention proposes a process for heat treatment of the body, including the bottom, of a preform (or of an intermediate container) made of a thermoplastic material, this process being carried out during manufacture of a container, such as a flask or bottle, in particular by means of blowing or stretching-blowing, during which heat treatment the preform, while being rotated on itself, travels through a heating furnace, said process being characterized basically by the fact that, since the entire preform body is heated to a temperature greater than the softening temperature of the thermoplastic material, at least one portion of the length of the preform body in rotation on itself is made to travel in alternating fashion in front of heating areas and non- or reduced-heating areas located at least on one side of the path followed by the preform in the furnace, so that least one longitudinal portion, or several circumferentially-separated longitudinal portions, of the preform body extending over at least said part of the length of the body is heated to a temperature greater than that of the rest of the body, the spacing separating the heating areas being determined as a function of the number of longitudinal portions of the body to be preferentially heated and of the perimeter of the preform body, in such a way that the longitudinal portions of the preform body to be preferentially heated pass in front of the successive heating areas during the combined linear travel and rotational motions of the preform, while the interposed longitudinal portions requiring less heating pass in front of the successive non- or reduced-heating areas.

By virtue of this selective heating, the body of the preform (or of the intermediate container) comes to incorporate one or several relatively hotter longitudinal portions, which alternate with the relatively cooler interposed longitudinal portions and which are more easily susceptible to deformation than the latter during a subsequent preform body-deformation process utilizing, for example, blowing or stretching-blowing. Accordingly, the relatively hotter portions can be stretched more than the relatively cooler ones. If, in relation to the preform axis, they travel radially over a distance smaller than that travelled by the cooler portions, their increased deformation capability makes it possible to stretch them circumferentially to a greater degree. They are thus enabled to supply material to the relatively cooler portions, which undergo more pronounced greater radial movement.

Because of this differential distribution of material made possible by selective or differentiated heating of the preform body, the final product is a container body having a complex shape and a wall thickness which is approximately uniform at any point whatever, including the parts farthest from the axis of the initial preform. The same situation is true if the final container is completely asymmetrical (neck laterally offset in relation to the body and existence of a gripping handle). These same conditions are again produced in the bottom of the body, which may have a more or less uniform thickness both in the parts most distant from the axis of the initial preform and in the parts most contiguous to it.

The thickness of the body wall can henceforth be determined with precision depending on the desired strength, and the elimination of localized excess thicknesses in containers manufactured to date yields substantial savings of the quantities of material required for each container.

The selective heating process sought can be carried out in different ways, either in the preform itself or in the heating means.

As regards selective heating of the preform body by using suitable means in the area of the perform itself, and from the perspective of the most widely-used configuration of heat-treatment equipment in which the objects travel through an oven, one of the following solutions may be considered:

a) cause the preforms to travel through the oven while rotating on themselves at a non-uniform speed, so that certain longitudinal portions are exposed longer than others to the thermal radiation. Here again, however, practical implementation seems complicated and costly; and b) each preform, which is mounted on base a continuously rotating on itself, is fitted with a suitable shield protecting the longitudinal portions that are to be kept relatively cooler. However, this solution appears costly (equipment with a shield for each preform base over the entire transfer line) and impractical (loading the preforms on the bases can be hindered by the shield, and there is the need to change the shields in order to manufacture containers having different shapes and/or sizes).

Although the implementation of selective heating by using suitable means in the area of the perform itself can certainly be contemplated in certain specific cases, in particular by utilizing one of the aforementioned solutions, the problems and costs of this method make it preferable to consider the incorporation of selective heating of the body into the heating apparatus itself, so as to retain conventional preform-transfer systems providing for periodic rotation of the preforms on themselves, since, as currently designed, these systems are reliable and entirely satisfactory. Moreover, the continued practice of rotating the preform on itself appears necessary to achieve uniform heating of the preform body, at least to a values greater than the softening temperature of the thermoplastic material. This uniform heating is an essential factor allowing the subsequent container body-shaping process by blowing or stretching-blowing to be carried out satisfactorily.

As a simple explanation, the process is advantageously implemented so that the preform-travel speed and the preform-rotating speed are virtually constant, and that the heating areas are spaced apart from each other by substantially uniform distances.

Concretely, provision may be made to ensure that, starting on at least one side of the oven, the preform bodies are heated discontinuously by the successive heating areas, which are spaced apart along the course of travel of the preforms and form the aforementioned heating zones. In particular, several heating devices are positioned on at least one side of the oven along the course of travel of the preforms.

However, the heating devices are composed in practice of radiating tubes sold commercially in standardized lengths, which may not precisely match the heating lengths desired for effecting the process. Faced with the difficulty, and indeed the impossibility, of procuring tubes of the desired length, it may prove advantageous to employ a variant embodiment in which heating devices are placed on at least one side of the oven, and screens spaced apart from each other are positioned in succession in front of these devices and along the course of travel of the preforms.

However, no matter what the variant implemented, the aforementioned arrangement of the heating devices may lower the overall heating strength of the preform body, and/or cause uneven overall heating, thereby making it difficult to maintain a uniform body temperature at least equal to the softening temperature of the thermoplastic material.

It may thus be preferable to achieve the desired selective heating of the body by fitting out another part of the heating apparatus, i.e., by positioned reflectors opposite the heating devices on the other side of the course of travel of the preforms. As was stressed above, these reflectors are used conventionally in ovens to reflect back onto the perform bodies the fraction of the radiation emitted by the heating devices which has passed between successive bodies, so as to improve the output of the oven.

Thus, in accordance with the invention, the preform bodies are heated from one side of the oven, and, from the opposite side of the oven, the thermal radiation is reflected back from the successive, spaced reflective areas along the course of travel of the preform, which form the aforementioned heating zones. It then becomes possible on said opposite side of the oven either to provide several successive reflectors placed along the course of travel of the preforms, or, as a variant, to provide a substantially continuous reflector and to arrange in front of the latter successive, non-reflecting screens spaced apart form each other along the course of travel of the preform; or, in yet another variant, to provide a substantially continuous, non-reflecting wall and to arrange in front of this wall successive reflectors spaced apart along the course of travel of the preform.

While the solution entailing positioning of the reflectors may potentially be combined with the solution involving the arrangement of the heating devices, it appears that the use of reflectors alone yields optimal operating flexibility. Indeed, while the heating devices kept in their conventional configuration supply the incident energy for heating the entirety of the body, a suitable arrangement of the reflectors alone gives the heating selectivity sought for, by overheating only the required longitudinal portions of the body to a value above the temperature produced principally by the heating devices. Moreover, the use of discontinuous reflectors placed in front of a continuous non-reflecting wall proves to be especially advantageous on a practical level, since a number or all of the reflectors can be made simply of a plate suitably shaped to incorporate successive notches and which is, above all, easily detachable and replaceable, thereby simplifying the modification of the apparatus for manufacture of various types of containers.

In another field of application of the process according to the invention, at least one or several annular portions of the preform body separated longitudinally from each other are heated to a temperature lower than that of the rest of the body.

By virtue of this process, the preform body incorporates one or multiple relatively cooler annular portions, which alternate with relatively hotter annular portions and which can be deformed less easily than the latter during a subsequent deformation of the preform body. The presence of at least one relative cooler, less deformable annular portion gives, on the body of the finished container, an annular portion whose thickness exceeds that of the rest of the body and which serves as a peripheral reinforcement area, or reinforcing collar.

Advantageously, in implementing the process entailing the travel of the preform through a heating furnace while it simultaneously rotates on itself, the preform body is heated from one side of the oven, and the thermal radiation is not reflected back from the opposite side of the furnace on at least one non-reflecting band-shaped area extending substantially parallel to the direction of travel of the preform and located opposite at least one annular portion of the preform body which is to be relatively cooler, while the thermal radiation is reflected in at least one band-shaped reflecting area extending parallel to the direction of travel of the preform and located opposite the rest of the preform body to be made relatively hotter.

To avoid undesirable side-effects, the non-reflecting areas should, moreover, absorb the incident thermal radiation.

According to a second feature, the invention further proposes an oven for the heat treatment of the body of a preform (or of an intermediate container) made of a thermoplastic material during the process for manufacture of a container, such as a flask or bottle, in particular by means of a blowing or stretching-blowing process, said oven being configured according to the invention and characterized mainly by the fact that, being fitted out to heat the entirety of the perform body to a temperature greater than the material-softening temperature, it incorporates, on at least one side of the course of travel of the preform while it rotates on itself, an alternating arrangement of heating zones and of non- or reduced-heating zones placed opposite at least one part of the length of the preform body in order to heat, to a temperature greater than that of the rest of the preform body, at least one longitudinal portion of the preform body or several longitudinal portions thereof separated from each other circumferentially and extending over at least said part of the length of said body, the spacing of the heating zones being determined based on the number of longitudinal portions of the preform body to be preferentially heated and on the perimeter of the preform body, in such a way that the longitudinal portions of the preform body to be preferentially heated come to be positioned in front of the successive heating zones during the travel and rotational movements of the preform, while the interposed longitudinal portions to be heated to a lesser degree come to be positioned in front of the successive non- or reduced-heating zones.

Since the rate of travel of the preform and the speed of rotation of the preform on itself being approximately constant, the heating zones are advantageously spaced apart by substantially uniform distances.

According to a first possible general configuration, the oven incorporates discontinuous heating devices located on at least one side of the oven, which demarcate said successive, spaced heating zones along the course of travel of the preform. In this case, the discontinuous heating devices may comprise several successive, spaced heating elements positioned along the course of travel of the preform; or else, in a variant, the discontinuous heating means may incorporate a continuous heating element and successive screens which are arranged in front of said element and are spaced apart from each other along the course of travel of the preform.

According to another possible general configuration, which is preferred in practice, the oven comprises, on one of its sides, at least one heating element and, on its opposite side, means for reflecting the incident thermal radiation which are arranged so as to form successive reflecting zones spaced apart along the course of travel of the preform, and which constitute the aforementioned heating zones. In this case, said reflection means may, on side opposite side, incorporate several successive reflectors spaced apart along the course of travel of the preform; or else, in a variant, a substantially continuous reflector and, positioned in front of the latter, successive non-reflecting screens spaced apart along the course of travel of the preform; or, yet again, in a preferred embodiment, a substantially continuous, non-reflecting wall and, arranged in front of the latter, successive reflectors spaced apart along the course of travel of the preform.

In this latter case, at least several reflectors may be brought together in one plate shaped so as to incorporate successive notches and removably attached in front of said non-reflecting wall. In this case, a simple and easily-modifiable configuration is obtained as a function of the different types of containers to be manufactured.

When, in particular, the non-reflecting wall also absorbs the wavelength of the incident thermal radiation, the non-reflecting wall should be cooled in order to avoid excess overheating.

In an embodiment providing for operational flexibility, the non-reflecting wall is advantageously produced in modular form, so that is can easily be adapted to preforms of various lengths. Accordingly, the non-reflecting wall is composed of a stack of bars whose inward-directed surface is blackened and through which a cooling fluid advantageously circulates.

To implement the process according to the invention in the second field of application mentioned above, provision is made, more especially, to ensure that the oven incorporate means for heating, to a temperature less than that of the rest of the preform body, at least one annular portion of the preform body, or several annular portions spaced apart longitudinally.

In a preferred embodiment, the oven comprises heating devices on one side of the path followed by the preform as it travels while rotating on itself, and, on the opposite side, it comprises at least one zone which does not reflect thermal radiation, this band-shaped non-reflecting zone extending substantially parallel to the direction of travel of the preform and positioned opposite at least one annular portion of the perform body to be made relatively cooler, and at least one zone which reflects thermal radiation, this band-shaped reflecting zone extending substantially parallel to the direction of travel of the perform and positioned opposite the rest of the preform body to be made relatively hotter.

To avoid re-emission of the thermal radiation accompanied by a shift of its wavelength, which could disrupt the proper operation of the oven, the non-reflecting zones or walls are, moreover, preferably made absorbent for incident thermal radiation.

BRIEF DESCRIPTION OF THE DRAWINGS

The invention will be better understood from a reading of the following description of a number of embodiments specifically considered and provided solely as non-limiting examples. In this description, reference is made to the attached drawings, in which.

DETAILED DESCRIPTION OF THE PREFERRED EMBODIMENTS

Figure 1:
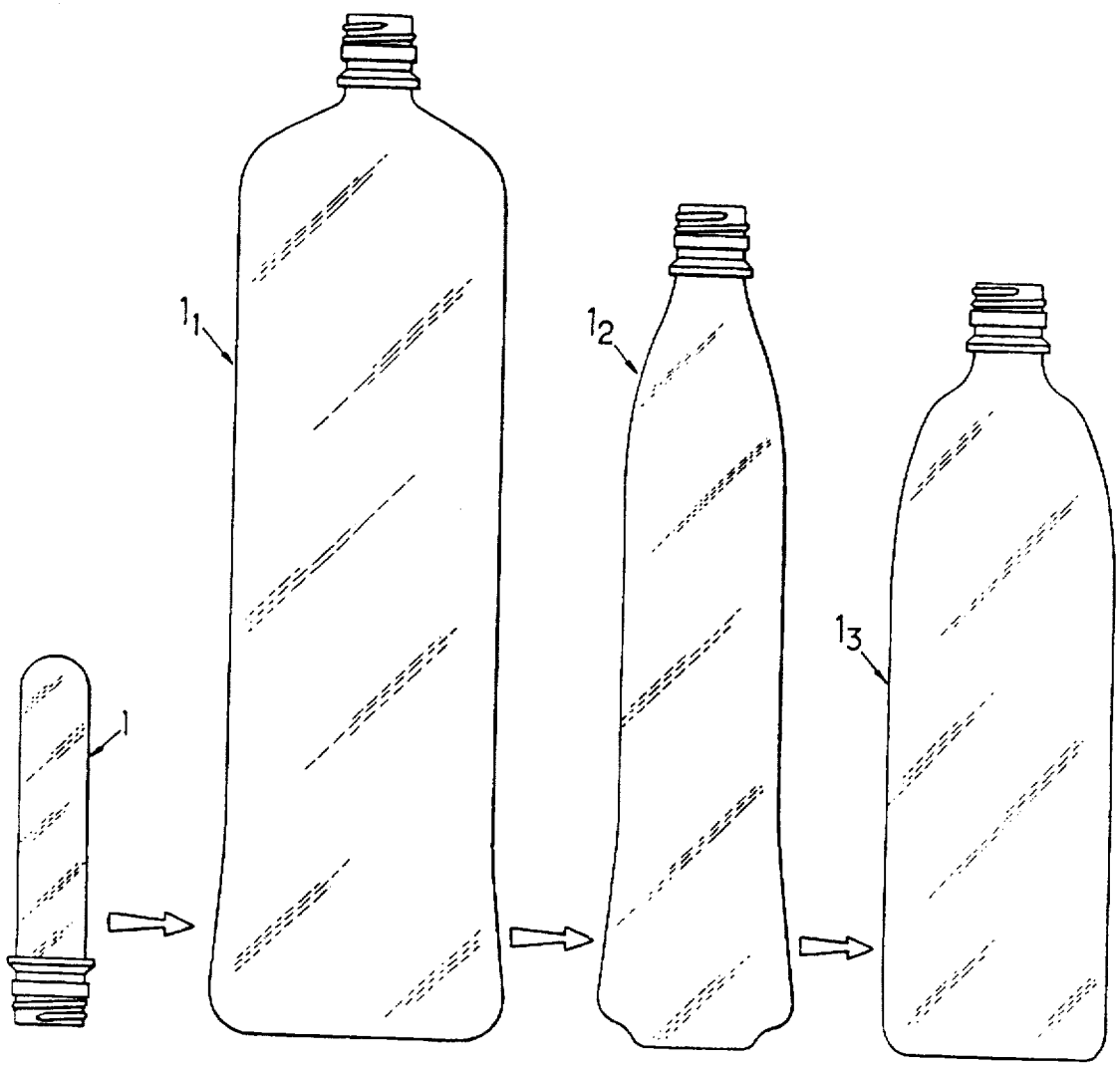
FIG. 1 is a diagrammatic view illustrating the shapes produced during implementation of the process comprising two successive blowing and/or stretching-blowing steps, in accordance with the state of the art.

The following detailed explanations provided with reference to the attached drawings concern, more specifically, the treatment of a preform, it being understood, however, that the arrangements described could just as easily be applied to an intermediate container, such as the intermediate container $1_2$ in FIG. 1, as previously explained.

To surmount the difficulties caused by uniform heating of the preform bodies according to conventional practice, the invention proposes means which, while providing that the entire body 2 of the preform 1 will be heated to a temperature greater than the softening temperature of the thermoplastic material, ensure that at least one portion of the body will be heated to a temperature exceeding that of the rest of the body (while at the same time, of course, ensuring that the crystallization temperature of said material not be reached).

Figure 3A:
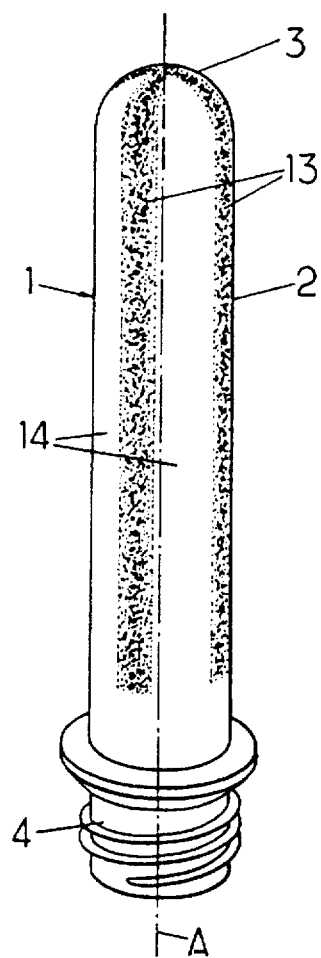
FIGS. 3A and 3B are schematic views, in perspective and in transverse cross-section, respectively, illustrating a first field of application of the process according to the invention.
Figure 3B:
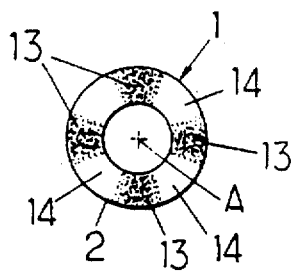

The process consists of heating to a still higher temperature one longitudinal portion 13 (shown in gray shading in FIGS. 3A and 3B to facilitate the understanding of the drawings) or several longitudinal portions separated circumferentially from each other by cooler portions. Each hotter longitudinal portion 13 extends over at least a section of the length of the body 2 and has a circumferential dimension matching the peripheral dimension and the distance of axis A from the equivalent part of the finished container body. Of course, the hotter and cooler portions are not separated by clear-cut boundaries; there is a temperature gradation between these two sections, this variation being entirely consistent with the gradually-increasing distance between the axis A and the most distant parts of the finished container body.

The hotter longitudinal portions 13 can be reshaped more easily than the cooler longitudinal portions 14 when the preform is subsequently reshaped so as to produce the container body, e.g., by reshaping by blowing or stretching-blowing in a suitable mold.

Figure 4:
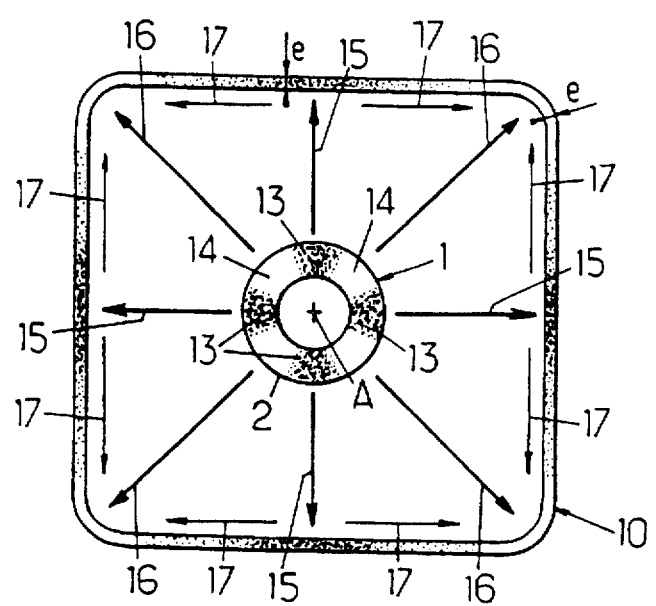
FIG. 4 is a highly diagrammatic view in transverse cross-section illustrating the advantages gained by a container produced from a preform according to FIGS. 3A and 3B and heat-treated according to the invention.

Thus, during this reshaping operation, the relatively hotter portions 13 possess an increased stretching capability as compared with the relatively cooler portions 14. If they are moved radially by a distance (arrow 15 in FIG. 4) smaller than that corresponding to the portions (arrows 16) more remote from the axis A of the preform, their greater shaping capability allows them to be stretched peripherally to a greater degree. Thus, the hotter portions 13 can supply material (arrows 17) to the relatively cooler portions, which undergo greater radial movement.

This differential distribution of material, which is made possible by a differentiated or selective heating of various longitudinal portions of the body 2 of the preform 1 as arranged circumferentially ultimately produces a finished container body 10 which may embody a complex shape (e.g., square, as shown in FIG. 4c, which illustrates the preform body and the body of the finished container together in transverse cross-section) and a wall thickness e approximately uniform at any point whatever, including the parts (angles incorporated into the body) most distant from the axis A of the starting preform.

It will be understood that a suitable heat treatment of the preform body in the same way allows production of a completely asymmetrical finished container; for example, a container having a neck laterally offset in relation to the body and a handle).

Of course, this differentiated reshaping process of the thermoplastic material is not reserved for the lateral wall of the body alone, but can also be implemented to shape the container bottom, thereby eliminating a cause of the subsequent deformation (differentiated contraction) which appears in the bottoms of conventionally-manufactured containers when they are subjected to thermal or mechanical stresses.

One thus gains the basic advantage of being able to produce containers having more or less uniform thickness at any point in the body (i.e., the shoulder, the bottom, and the part extending between them). This thickness can be minimally predetermined in order to impart the desired mechanical strength, and the superfluous excess thicknesses at certain spots in conventionally-produced containers are eliminated. The use of the process according to the invention thus yields extremely high savings of raw material, and, therefore, of the cost of manufacturing large runs of containers.

Implementation of the process just described, which allows the production in the preform body of hotter longitudinal portions 13, can be carried out in many ways by adopting from the outset the widespread current practice of a heat treatment applied to preforms moving through an oven. In FIGS. 5–10 to which illustrate the principle technical solutions that can be considered, only the basic components of the oven necessary to the understanding of the invention have been shown (e.g., the heating elements and, as required, the reflectors).

Figure 5:
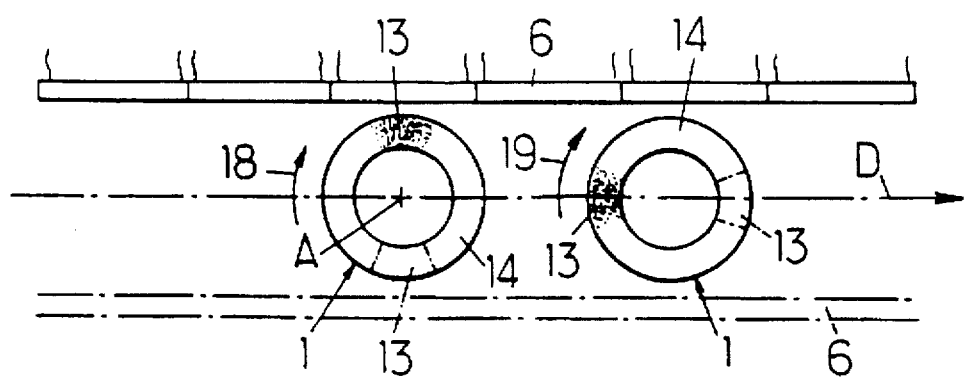
FIGS. 5 to 9 are highly diagrammatic top views illustrating, respectively, several possible oven configurations according to the invention which make it possible to obtain the desired selective heating of the preform bodies.

A first possible solution, shown diagrammatically in top view in FIG. 5, consists in causing the preforms to rotate on themselves at variable speed while they are being moved forward. The preform turns slowly (as shown by the small arrow 18 in front of the preform 1 on the left) when one or several predetermined longitudinal portions 13 pass in front of the heating elements 6, so that this or these portions 13 will be overheated, while the preform rotates faster (large arrow 19 in front of the preform on the right) when one or several longitudinal portions 14 (other than the portion or portions 13 mentioned above) pass in front of the heating elements 6, so that this portion or these portions 14 will be heated to a lesser degree. If there is an even number of diametrically-opposed overheated portions 13, second heating elements 6 may be provided on the opposite side of the oven.

While this solution has the advantage of allowing the production of any number whatever of overheated portions 13, it has, on the other hand, the disadvantage of the need to cause the preforms to rotate at a rapidly-variable speed, an arrangement which is difficult to produce technically and is thus costly, and which, here again, requires an undesirable modification of current apparatuses.

Figure 6:
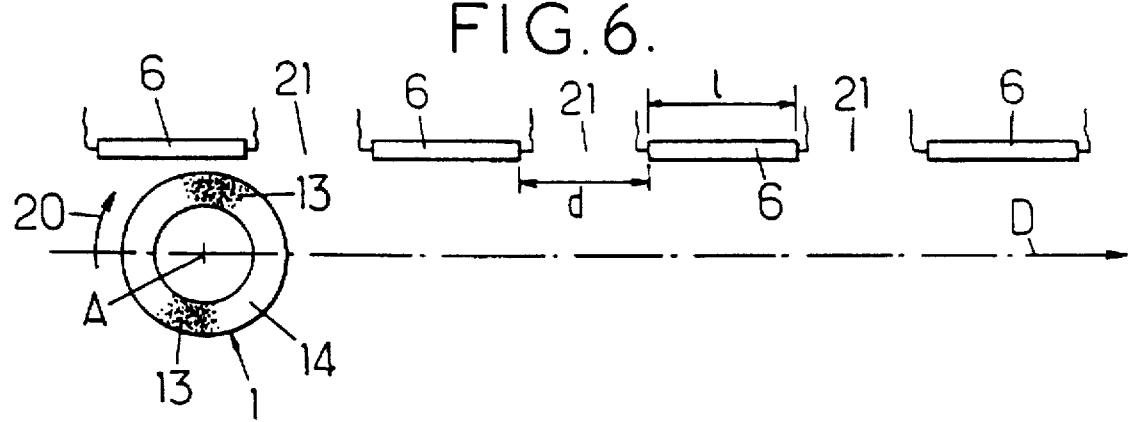

Instead of the preceding solutions based on controlling the mode of travel of the preforms, it is possible to control adequately the heating devices while preserving the combined movement of the preforms, i.e., travel along axis D and rotation on themselves (arrow 20 in FIG. 6 and others).

In the solution illustrated in FIG. 6, the heating devices are heating elements 6 positioned on a single side of the oven and arranged discontinuously parallel to the direction of travel D of the preforms, while gaps 21 are provided so that each rotating preform 1 exposes predetermined longitudinal portions 13 to the successive heating elements 6 and predetermined longitudinal portions 14 to the gaps 21 separating the successive heating devices 6.

Figure 2A:
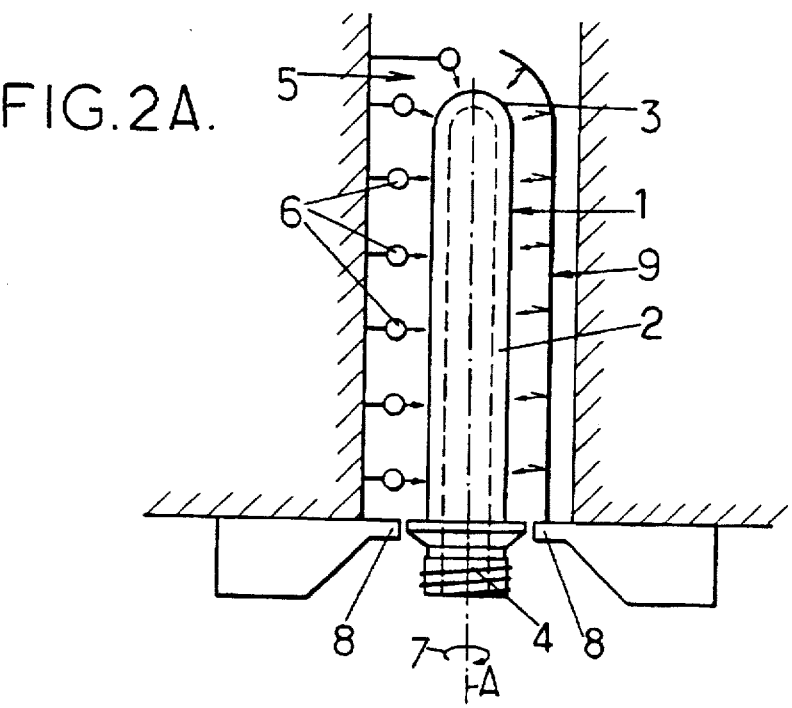
FIG. 2A is a very schematized cross-section illustrating the general principle underlying the heating of the body of a preform made of a thermoplastic material in an oven.
Figure 2B:
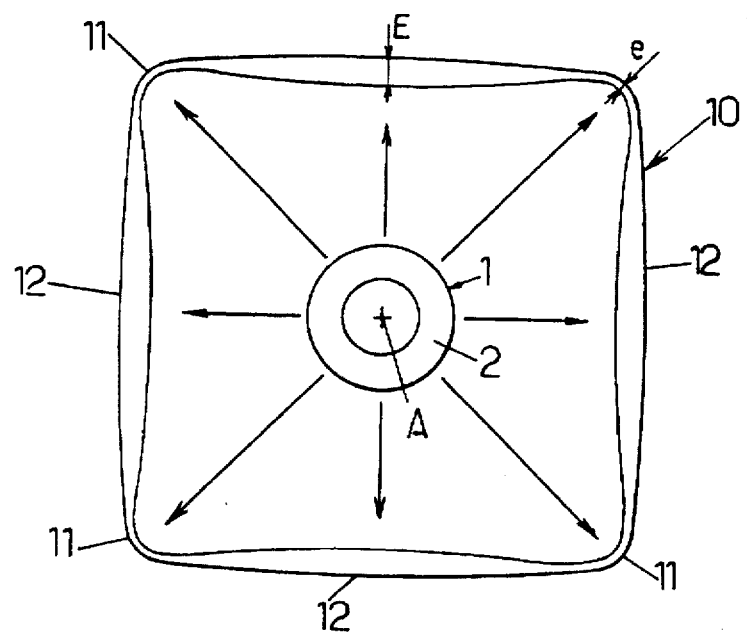
FIG. 2B is a very schematic view in transverse cross-section illustrating the defects exhibited by a container produced from a preform heat-treated according to the state of the art.

The correct operation of the equipment requires that the length 1 of the heating devices, the value d of the gaps separating the heating elements, and the perimeter of the preform bodies match each other. Now the heating devices are theoretically composed of columns of heating tubes arranged parallel to each other (see FIG. 2A). The tubes widely available commercially are sold in a limited number of different lengths, a factor which may not prove suitable for the solution as contemplated. The manufacture of a special run of tubes having the desired length is much too expensive an option.

Figure 7:
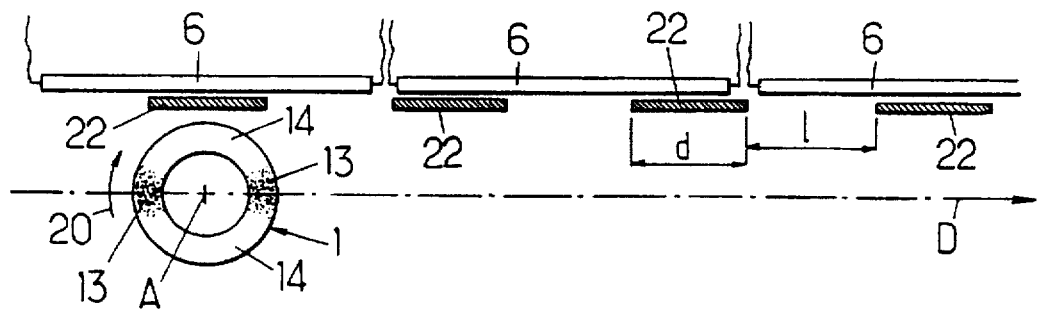

The solution shown in FIG. 7 avoids this problem. The conventional arrangement of the heating devices 6 placed in continuous succession one after the other is preserved, and shields 22 are positioned in front of the heating elements, these shields having a length d (corresponding to the distance d in FIG. 6) and being spaced apart by a distance 1 (corresponding to the theoretical length 1 of the heating devices in FIG. 6).

This solution, too, appears, however, to be difficult to implement. In fact, the shields 22 (made, for example, of metal plates) are positioned in immediate proximity to the heating elements 6, which generate high thermal energy; they are thus subject to deformation, and even deterioration of the material composing them caused by the heat. Moreover, heating of the entire preform body 1, which must be uniformly heated to a temperature greater than the softening temperature of the thermoplastic material, can be effected only unevenly, and the desired uniform heating of the body becomes uncertain.

Figure 8:
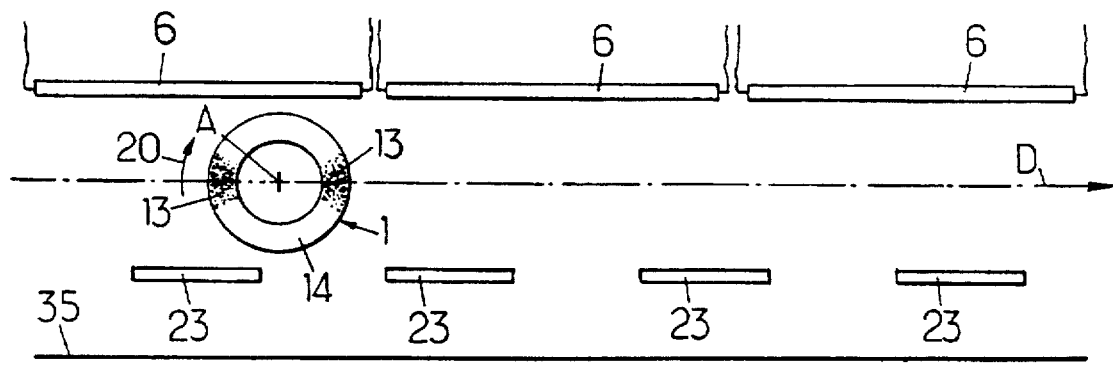
Figure 9:
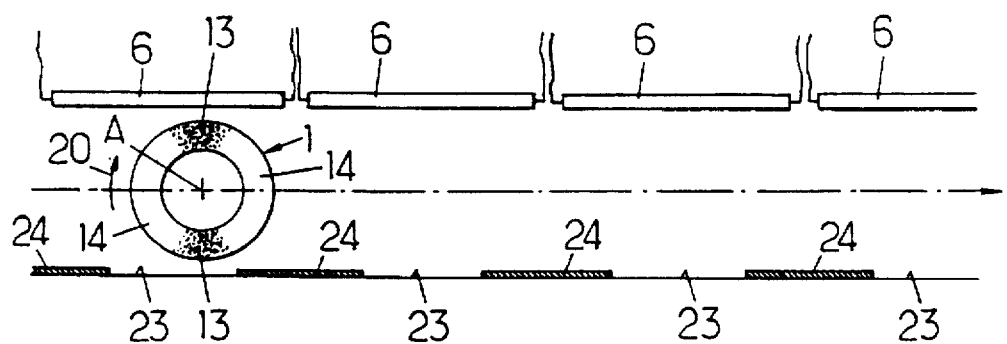
Figure 10:
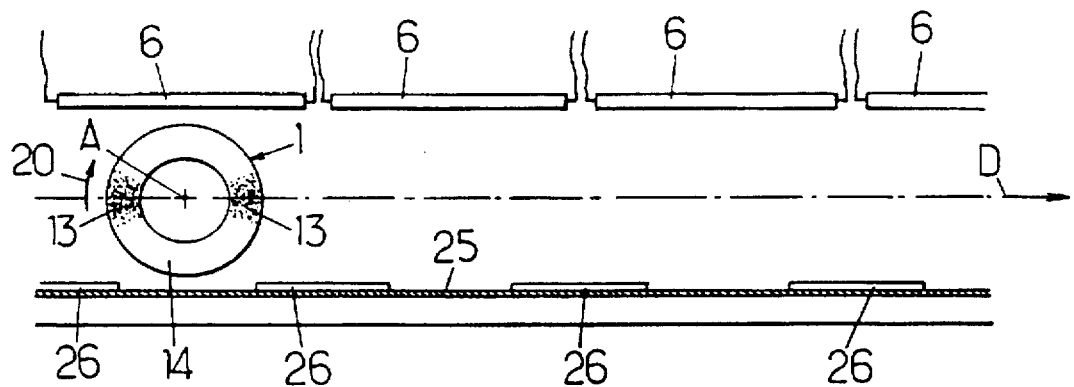
FIGS. 10 and 11 are diagrammatic perspective top and front views, respectively, of another possible oven configuration according to the invention.

The solutions shown in FIGS. 8 to 10 solve these problems. In these solutions, the heating devices include not only heating elements 6 arranged on one side of the oven, but also reflecting devices (as shown in FIG. 1) arranged on the opposite side of the oven and capable of reflecting the thermal radiation passing between consecutive preforms back toward the center of the oven, the oven output thus being appreciably increased.

Accordingly, in the overall solution illustrated in FIG. 8, the thermal radiation is reflected back discontinuously in the areas 23 arranged so that only the longitudinal portions 13 of the preform bodies 1 are exposed to this side of the oven, while, on the opposite side of the oven, the heating elements 6 arranged continuously provide for the uniform heating required to soften the thermoplastic material of which the entire body is made. In a variant, a non-reflecting wall 35 may be positioned behind these areas 23 to halt the propagation of thermal radiation passing beyond these areas 23.

A practical embodiment could entail joining together, in front of a continuous reflector 9 often placed in the oven (see FIG. 2A), non-reflecting shields 24 (black, for example), which are positioned discontinuously one after the other, so as to produce a reflector 9 incorporating reflecting windows 23 (FIG. 9).

However, the non-reflecting shields, which absorb all or a part of the incident thermal radiation, become heated and, since they behave like a black body, re-emit toward the preforms a modified-frequency radiation which may disrupt the process for selective heating of the preform bodies. To avoid this problem the shields 24 should thus be cooled.

Figure 11:
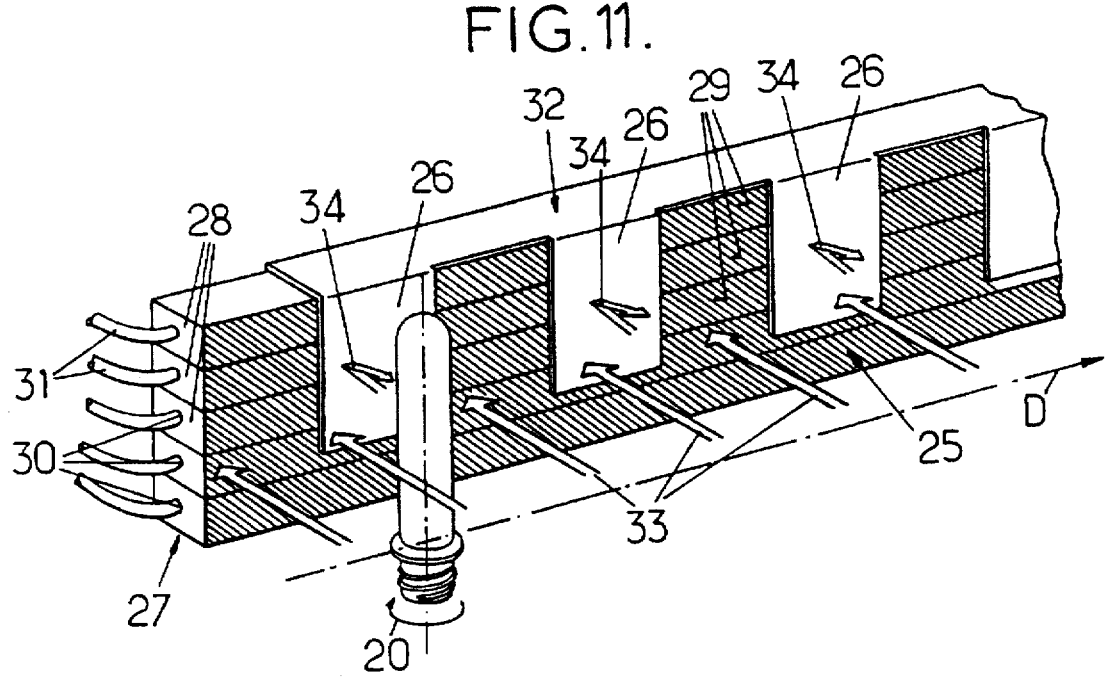

The technical solution illustrated in FIGS. 10 and 11 allows resolution of all of the problems arising from the other difficulties reviewed above, including the solution illustrated in FIG. 9. All other elements being identical, as shown in FIG. 10, the side of the oven opposite the heating elements 6 is provided with a continuous, non-reflecting surface 25 which absorbs incident thermal radiation (i.e., a black surface). Reflecting plates 26 are arranged on this surface one after the other and spaced apart in such a way that the desired selective overheating of predetermined longitudinal portions 13 of the preform bodies is achieved.

In practice, as shown in perspective in FIG. 11, a modular wall 27 is formed by stacking bars 28 having a face 29 turned toward the center of the oven and blackened (i.e., a non-reflecting, absorbent face), the entire group of faces 29 forming the aforementioned surface 25. The bars 28 incorporate longitudinal holes 30 connected at their ends to a cooling fluid (i.e., water)-circulation loop 31.

The reflecting plates 26 may form an integral part of a single metal component 32 cut into notches. In FIG. 11, the incident thermal radiation is schematized by arrows 33, and the thermal radiation reflected back by the plates 26 is schematized by broken arrows 34.

In addition to the fact that it permits reliable operation of the equipment, this arrangement provides for flexibility of use and, by changing the number of bars 28 and by replacing the component 32, it can be adjusted rapidly and easily to accommodate changes of preform size and of the number of overheated longitudinal portions for each preform body.

Figure 12:
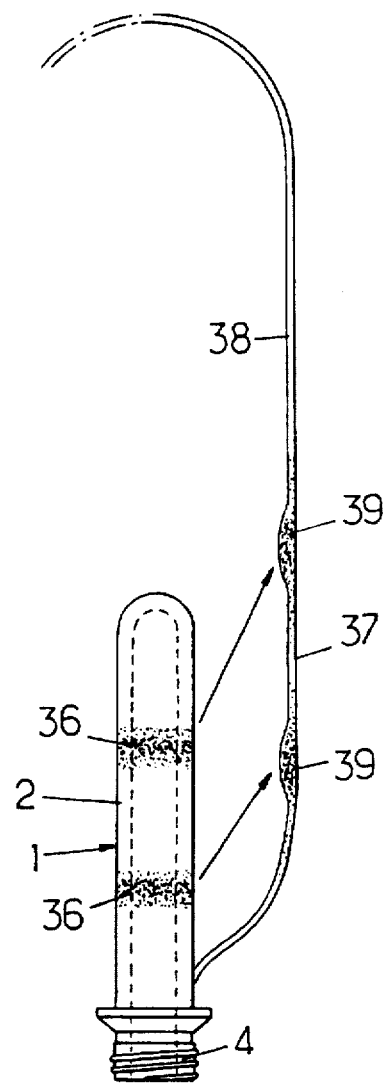
FIG. 12 is a diagrammatic view illustrating another field of application of the process according to the invention.

In combination with the preceding arrangements, it is possible, moreover, to ensure that at least one annular portion 36 of the body 2 of the preform 1, or several annular portions separated longitudinally from each other, will be at a temperature lower than that of the rest of the body, while, in this case too, remaining at a temperature higher than the softening temperature of the thermoplastic material. As illustrated in FIG. 12, in which the cooler annular portions 36 are shown in gray shading, peripheral zones 39 having a thickness appreciably greater than the thickness of the wall in the rest of the body are produced at the corresponding sites of the body 37 of the finished container 38 obtained after reshaping (blowing or stretching-blowing).

The formation of annular portions 36 having a temperature lower than that of the rest of the body cannot, in practice, be produced simply by the judicious positioning of the heating tubes arranged on one side of the oven, because of the non-directed propagation of the thermal radiation and the overlapping of the radiation emanating from two adjoining tubes. As a result, to achieve the desired objective, advantage is gained, here again, by implementing variations in the heating of the body produced by reflecting and non-reflecting zones suitably configured opposite the moving preform bodies.

Figure 13:
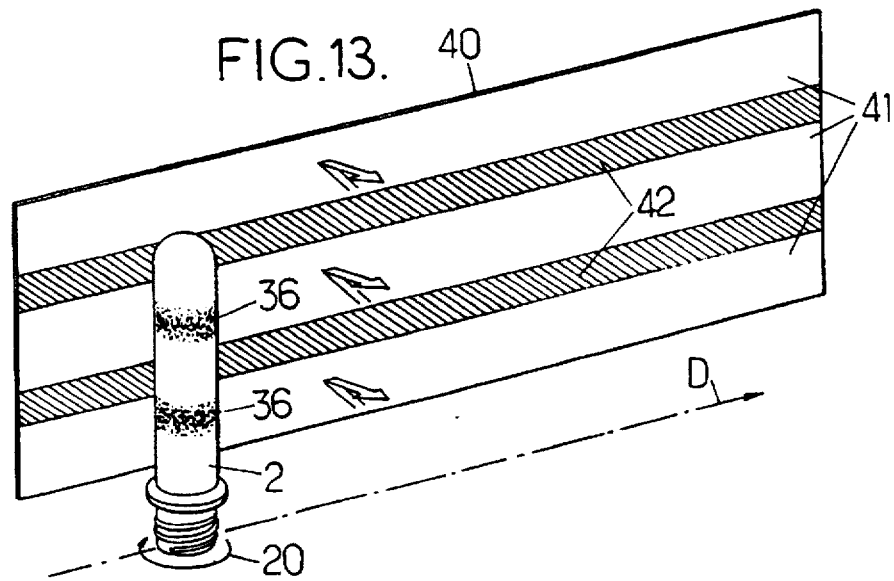
FIG. 13 is a diagrammatic perspective view illustrating a preferred embodiment of the process in FIG. 12.

To this end, as shown in FIG. 13, a panel 40 (or series of panels or similar objects) is positioned opposite the heating devices (not shown in FIG. 13). The face of this panel directed toward the inside of the oven is divided vertically into an alternating pattern of horizontal bands which are either reflective 41 and set opposite the areas of the perform bodies 2 to be made relatively hotter, or non-reflective 42 and set opposite the areas 36 of the perform bodies 2 to be made relatively cooler.

The non-reflecting areas preferably absorb the incident thermal radiation so as to avoid re-emission.

The combined heating of the longitudinal and annular portions of the preform bodies allows manufacture of especially complex (in particular, asymmetrical) shapes having walls of relatively uniform thickness, except in one or several thicker peripheral areas acting as mechanical reinforcements allowing the container to be grasped more easily.

It will be understood, furthermore, that a process comprising several successive blowing and/or stretching-blowing operations lends itself especially well to numerous applications involving the treatment of longitudinal and/or annular portions of the preforms and/or of the intermediate containers. In fact, combined heating of longitudinal and annular portions may be carried out:

on the preform alone as explained above, on an intermediate container only, or on the preform and on an intermediate container.

It is also possible to heat longitudinal portions of the preform only and to heat annular portions of an intermediate container only, or vice-versa.

Similarly, if a combination of thermal treatments is not desired, longitudinal (or annular) portions of the preform alone or of the intermediate container alone can be heated; or alternatively, longitudinal (or annular) portions of the preform can be heated, then those same portions on an intermediate container can be heated once again.

The process according to the invention thus lends itself to a very high degree of flexibility of implementation.

It is obvious from the foregoing discussion that the invention is in no way limited to the embodiments and applications more especially considered, but, to the contrary, encompasses all variants thereof.

We claim:

1. A process for the thermal treatment of the body of a preform or of an intermediate container made of a thermoplastic material during manufacture of a container by blowing or stretching-blowing, during which thermal treatment the preform rotates on a longitudinal axis thereof and travels through an oven wherein the entirety of the preform body is heated to a temperature greater than the softening temperature of the material, the improvement comprising the steps of:

a) passing at least one part of the length of the preform body in alternating fashion in front of heating zones and non- or reduced-heating zones disposed on at least one side of a path followed in the oven by the preform, so that at least one longitudinal portion of the preform body, or a plurality of longitudinal portions circumferentially separated from each other, extending over at least said one part of the length of the body is preferentially heated to a temperature greater than that of remaining portions of the body, and b) spacing the heating zones based on the number of longitudinal portions of the preform body to be preferentially heated and on a perimeter of the preform body, so that the longitudinal portions of the preform body to be preferentially heated are positioned in front of successive heating zones during the combined travel and rotation of the preform, while interposed longitudinal portions to be heated to a lesser degree are positioned in front of successive non- or reduced-healing zones, whereby one or a plurality of relatively hotter longitudinal portions are produced in the body of the preform or of the intermediate container, these portions alternating with relatively cooler interposed longitudinal portions and being capable of being reshaped more easily than said cooler longitudinal potions during subsequent reshaping of the preform body, thereby making it possible to manufacture containers having a body of complex shape and having at all points an approximately uniform wall thickness.

2. A process according to claim 1, wherein the rate of travel of the perform and the speed of rotation of the preform are approximately constant, and wherein the heating zones are spaced apart by substantially uniform distance.

3. A process according to claim 1 or 2, wherein, from at least one side of the oven, the perform bodies are heated discontinuously by successive heating zones spaced apart from each other along the path of travel of the preform.

4. A process according to claim 3, wherein a plurality of successive heating devices spaced apart from each other along the path of travel of the preform are disposed on at least one side of the oven.

5. A process according to claim 4, wherein continuous heating devices are disposed on at least one side of the oven, and successive shields spaced apart from each other along the course of travel of the perform are disposed in front of said heating devices.

6. A process according to claim 1, wherein the body of the preform is heated from one side of the oven and wherein, on the opposite side, thermal radiation is reflected back into successive reflecting zones spaced apart from each other along the path of travel of the perform.

7. A process according to claim 6, wherein a plurality of successive reflectors spaced apart along the path of travel of the perform are disposed on said opposite side of the oven.

8. A process according to claim 6, wherein a substantially continuous reflector is disposed on said opposite side of the oven, and successive, non-reflecting screens spaced apart along the path of travel are disposed in front of said reflector.

9. A process according to claim 6, wherein a substantially continuous, non-reflecting wall is disposed on said opposite side of the oven, and successive reflectors spaced apart along the path of travel are disposed in front of said wall.

10. A process according to claim 1, wherein at least one annular portion of the preform body or intermediate container, or a plurality of annular portions spaced apart longitudinally are heated to a temperature lower than that of the rest of the body, thereby forming in the preform body or the intermediate container one or a plurality of relatively cooler annular portions which alternate with relatively hotter annular portions and that are more difficult to reshape during a subsequent reshaping of the preform body, thereby making it possible to manufacture containers having a body which incorporates a peripheral reinforcement area of increased thickness.

11. A process according to claim 10, wherein the preform body is heated from one side of the oven and wherein, on the opposite side of the oven, thermal radiation is not reflected back in at least one non-reflecting, band-shaped area extending substantially parallel to the direction of the preform travel and located opposite at least one annular portion of the preform body to be heated to a relatively lesser degree, while thermal radiation is reflected back in at least one reflecting band-shaped area extending substantially parallel to the direction of travel of the preform and located opposite a remaining portion of the preform which is to be heated to a relatively greater degree.

12. A process according to claims 8 or 9 wherein the non-reflecting screens or wall absorb incident thermal radiation.

13. An oven for the heat treatment of the body of a preform or of an intermediate container made of a thermoplastic material during a process for manufacture of a container by a blowing or stretching-blowing process, wherein said oven is configured to heat the entirety of the preform body to a temperature greater than the material-softening temperature, the improvement comprising:

on at least one side of a path of travel of the preform through the oven while it rotates on a longitudinal axis thereof, an alternating arrangement of heating zones and non- or reduced-heating zones disposed opposite at least one part of a length of the preform body for preferentially heating at least one longitudinal portion of the preform body or several longitudinal portions thereof separated from each other circumferentially and extending over at least said one part of the length of said body to a temperature greater than that of remaining portions of the preform body, wherein the spacing of the heating zones is based on the number of longitudinal portions of the preform body to be preferentially heated and on a perimeter of the preform body such that the longitudinal portions of the preform body to be preferentially heated are positioned in front of successive heating zones during the travel and rotation of the preform, while interposed longitudinal portions to be heated to a lesser degree are positioned in front of successive non- or reduced-heating zones.

14. An oven according to claim 13, wherein the rate of travel of the preform and the speed of rotation of the preform are approximately constant and, the heating zones are spaced apart by substantially uniform gaps.

15. An oven according to claim 13 or 14, wherein said oven comprises discontinuous heating devices arranged on at least one side of the oven to delimit said successive heating zones spaced apart along the path of travel of the preform.

16. An oven according to claim 15, wherein said discontinuous heating devices comprise several successive heating devices spaced apart along the path of travel of the preform.

17. An oven according to claim 15, wherein said discontinuous heating devices comprise a continuous heating element and successive screens positioned in front of said element and spaced apart along the path of travel of the preform.

18. An oven according to claim 13, wherein said oven comprises, on one of its sides, at least one heating device, and on the opposite side, means for reflecting incident thermal radiation to form successive reflecting areas spaced apart along the path of travel of the preform, which form said heating zones.

19. An oven according to claim 18, wherein said reflecting means comprises a plurality of successive reflectors spaced apart along the path of travel of the preform.

20. An oven according to claim 18, wherein said reflecting means comprises a substantially continuous reflector, and successive non-reflecting screens spaced apart along the path of travel of the preform and disposed in front of said reflector.

21. An oven according to claim 18, wherein said reflecting means comprises, on said opposite side, a substantially continuous, non-reflecting wall, and successive reflectors spaced apart in front of said wall along the path of travel of the perform.

22. An oven according to claim 21, wherein a plurality of reflectors are brought together on at least one plate incorporating successive notches and removably attached in front of said non-reflection wall.

23. An oven according to claim 21 or 22, wherein said non-reflecting wall is cooled.

24. An oven according to claim 21 or 22, wherein said non-reflecting wall comprises a stack of bars having blackened faces directed toward the inside of the oven and through which a cooling fluid circulates.

25. An oven according to claim 13, comprising means for heating at least one annular portion of the preform body to a temperature lower than that of remaining portion of the preform body.

26. An oven according to claim 25, wherein said oven incorporates heating devices on one side of the path followed by the preform, and wherein, on the opposite side, said oven comprises at least one area that is non-reflective for thermal radiation, said non-reflecting area being band-shaped and extending substantially parallel to the path of travel of the preform and being disposed opposite said parallel to the path of travel of the preform and being disposed opposite said at least one annular portion of the preform body to be heated to a relatively lesser degree, and at least one area that is reflective for thermal radiation, said reflecting area being band-shaped and extending substantially parallel to the path of travel of the preform and being disposed opposite said remaining portions of the preform body to be heated to a relatively greater degree.

27. An oven according to claims 20, 21, or 26, wherein said non-reflecting screen areas or walls absorb incident thermal radiation.

* * * * *